United States Patent [19]

Morbieu

[11] Patent Number: 5,703,679
[45] Date of Patent: Dec. 30, 1997

[54] TRANSCEIVER HEAD FOR LONGITUDINAL DOPPLER SPEED INDICATOR

[75] Inventor: Bertrand Morbieu, Bordeaux, France

[73] Assignee: Sextant Avionique, France

[21] Appl. No.: 532,323

[22] Filed: Sep. 22, 1995

[30] Foreign Application Priority Data

Sep. 22, 1994 [FR] France .................. 94 11308

[51] Int. Cl.⁶ .................................................. G01P 3/36
[52] U.S. Cl. .................................. 356/28.5; 356/28
[58] Field of Search .................... 356/28.5, 5.13, 356/5.14, 28

[56] References Cited

U.S. PATENT DOCUMENTS

| | | | |
|---|---|---|---|
| 4,199,226 | 4/1980 | Weber et al. | |
| 4,575,238 | 3/1986 | Knühtsen et al. | 356/28.5 |
| 4,637,717 | 1/1987 | Brudnoy | 356/28.5 |
| 4,669,876 | 6/1987 | Dopheide | |
| 5,048,951 | 9/1991 | Combe et al. | 356/28.5 |
| 5,587,785 | 12/1996 | Kato et al. | 356/28.5 |

OTHER PUBLICATIONS

"Laser Doppler velocimeter for multicomponent measurements using an electro-optical modulator demonstrated for a two-component optical configuration", Bahnen et al; *Rev. Sci. Instrum.* 55 (7), Jul. 1984, pp. 1090–1093.

"Wind Velocity Measurement—A single laser-Doppler system measures three-component wind velocity in clear-air conditions"; NASA Tech Briefs, Summer 1976, vol. 1, No. 2, pp. 182–183.

*Primary Examiner*—Mark Hellner
*Attorney, Agent, or Firm*—Evan Kent; Stewart Gitler

[57] ABSTRACT

Transceiver head for a longitudinal Doppler speed indicator.

Transceiver head for a longitudinal Doppler speed indicator with at least one pair of measuring axes.

It comprises:

a laser (1);

polarization switching means (4) on the path of the laser beam;

polarization separating means (5) on the path of the polarized beam that comes from the switching means;

control means (5) for switching the switching means alternately from one state to another to direct the beam alternately to one measuring axis and then to another depending on its polarization state.

11 Claims, 3 Drawing Sheets

TRANSCEIVER HEAD FOR LONGITUDINAL DOPPLER SPEED INDICATOR

This invention relates to a transceiver head for a longitudinal Doppler speed indicator, and more particularly for such a speed indicator with at least one pair of measuring axes.

Longitudinal Doppler anemometry techniques in which a laser beam of frequency f is emitted from a vehicle, particularly an aircraft, which is in motion relative to the ambient air, are already known. Light that is backscattered by aerosols suspended in the air is received, and Doppler shift Δf of the frequency of the backscattered light is measured relative to frequency f. It is known that Doppler shift Δf is proportional to the projection of the velocity of the vehicle on the measuring axis.

It is therefore possible to determine the velocity vector by making three measurements on three different measuring axes. Actually, four measuring axes will preferably be chosen in order to have redundant data available.

Furthermore, it is desirable, for reasons of both weight and cost, to form all the beams from a single laser. It is therefore necessary to be able to split the beam that is emitted by the laser to direct it to the various measuring axes selected. It is also desirable not to direct the beam to all the measuring axes simultaneously, in order to have more power available for each measurement.

The purpose of the invention is to provide a transceiver head for a speed indicator which exhibits the above-mentioned characteristics and which, moreover, preferably does not comprise mechanical moving parts whose vibrations would be detrimental both to the reliability of the equipment and to the accuracy of the measurement.

For this purpose, the invention has as its object a transceiver head for a longitudinal laser speed indicator with at least one pair of measuring axes, characterized by the fact that it comprises:
  a laser;
  polarization switching means on the path of the laser beam;
  polarization separating means on the path of the polarized beam coming from the switching means;
  control means for switching the switching means alternately from one state to another to direct the beam alternately to a measuring axis then to another as a function of its polarization state.

Thus, a single laser is used in the transceiver head according to the invention, and its power output is alternately switched to one and then to the other of the axes of a pair of measuring axes.

The separating means can be produced, for example, from a Glan prism. Likewise, the polarization switching means can be produced from electrooptic-effect means, such as, for example, a Pockels-effect cell, a nematic or ferroelectric liquid crystal, or an elastooptic-effect ZnSe crystal. The transceiver head according to the invention consequently makes it possible to achieve the desired objectives without mechanical means.

In a particular embodiment, the separating means are arranged in such a way that the beam which comes from them is moved parallel to itself during the switching, with output optics being arranged to direct the beam to one of the measuring axes as a function of its movement.

A quarter-wave plate is advantageously placed at the output of the polarization separating means.

This plate has the effect of transforming the beam that is polarized linearly into a beam that is polarized circularly. Since aerosols have a generally spherical shape, the polarization of the backscattered beam is inverted circular. Behind the quarter-wave plate, the backscattered beam is therefore linearly polarized, but at 90° from the input beam. The beam therefore always emerges in the same direction from the polarization separating means and can be collected at this point by suitable means, for example by an optical fiber.

Also in a particular embodiment, the output optics of the transceiver head according to the invention consist of a telescope.

By way of nonlimiting example, a particular embodiment of the invention will now be described with reference to the accompanying drawings, in which.

Figure 2:
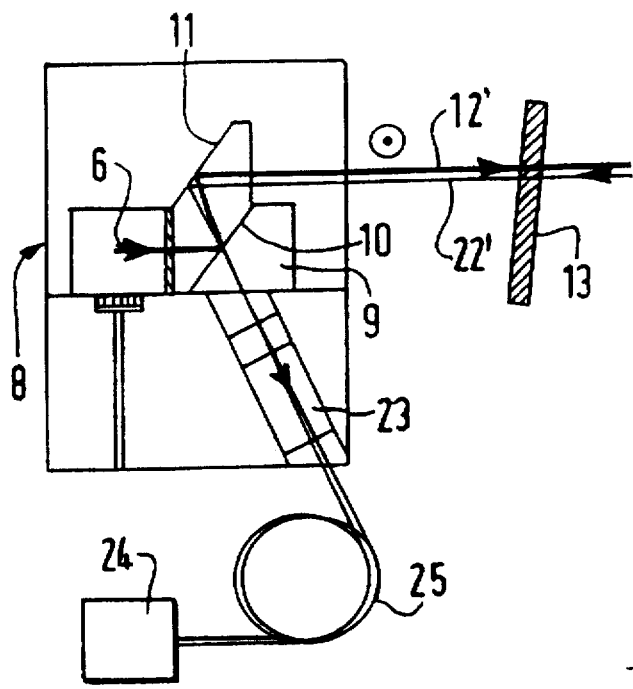
FIG. 2 is a view in section of the polarization separating means that are presented in FIG. 1, along line II—II of FIG. 3.
Figure 3:
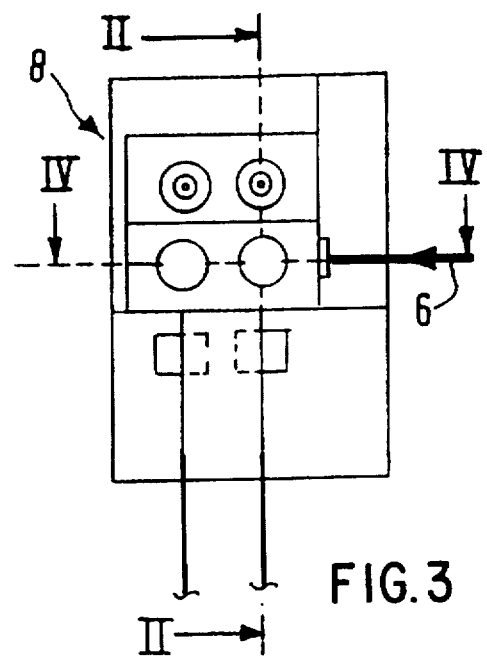
FIG. 3 is a front view of the polarization separating means.
Figure 4:
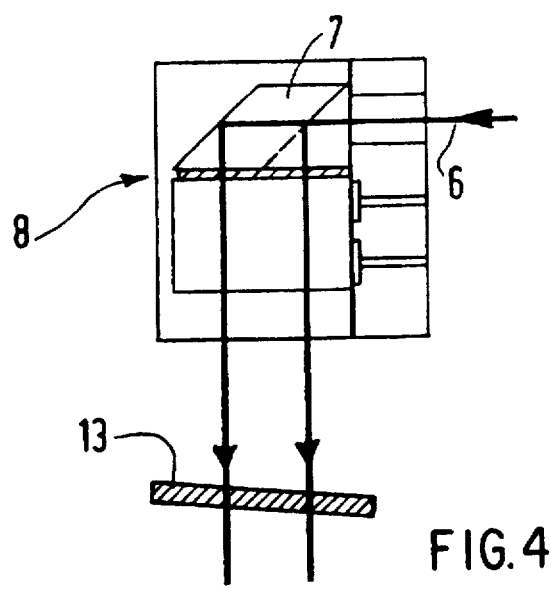
FIG. 4 is a view in section along line IV—IV of figure 3.
Figure 6:
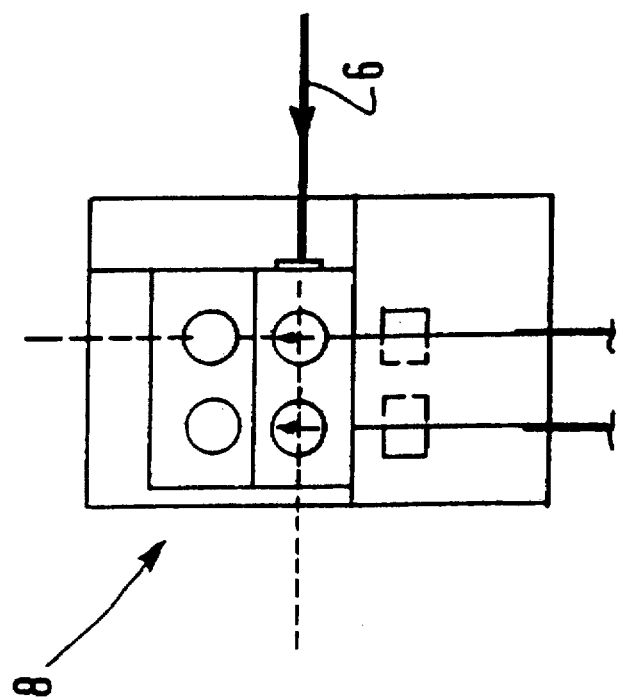
Figure 5:
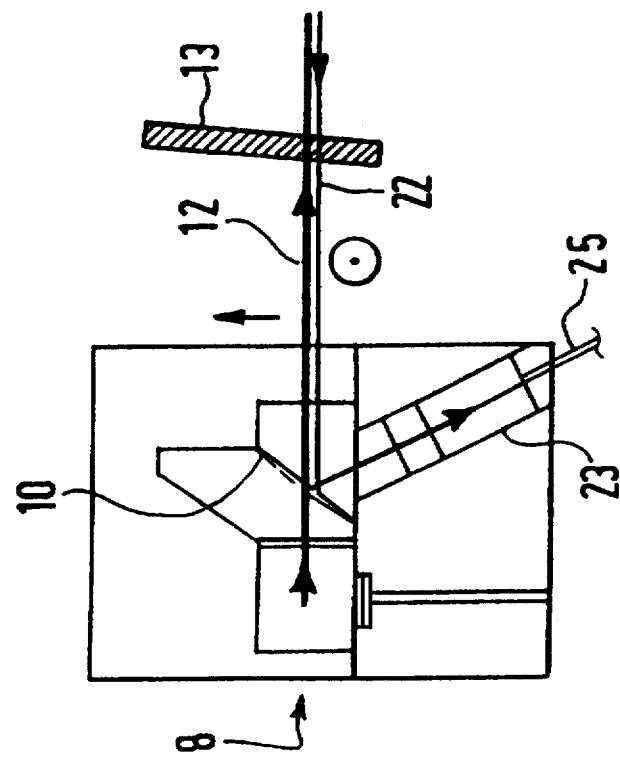

FIGS. 5 and 6 are figures that are analogous to figures 2 and 3 for another polarization of the input beam.

Figure 1:
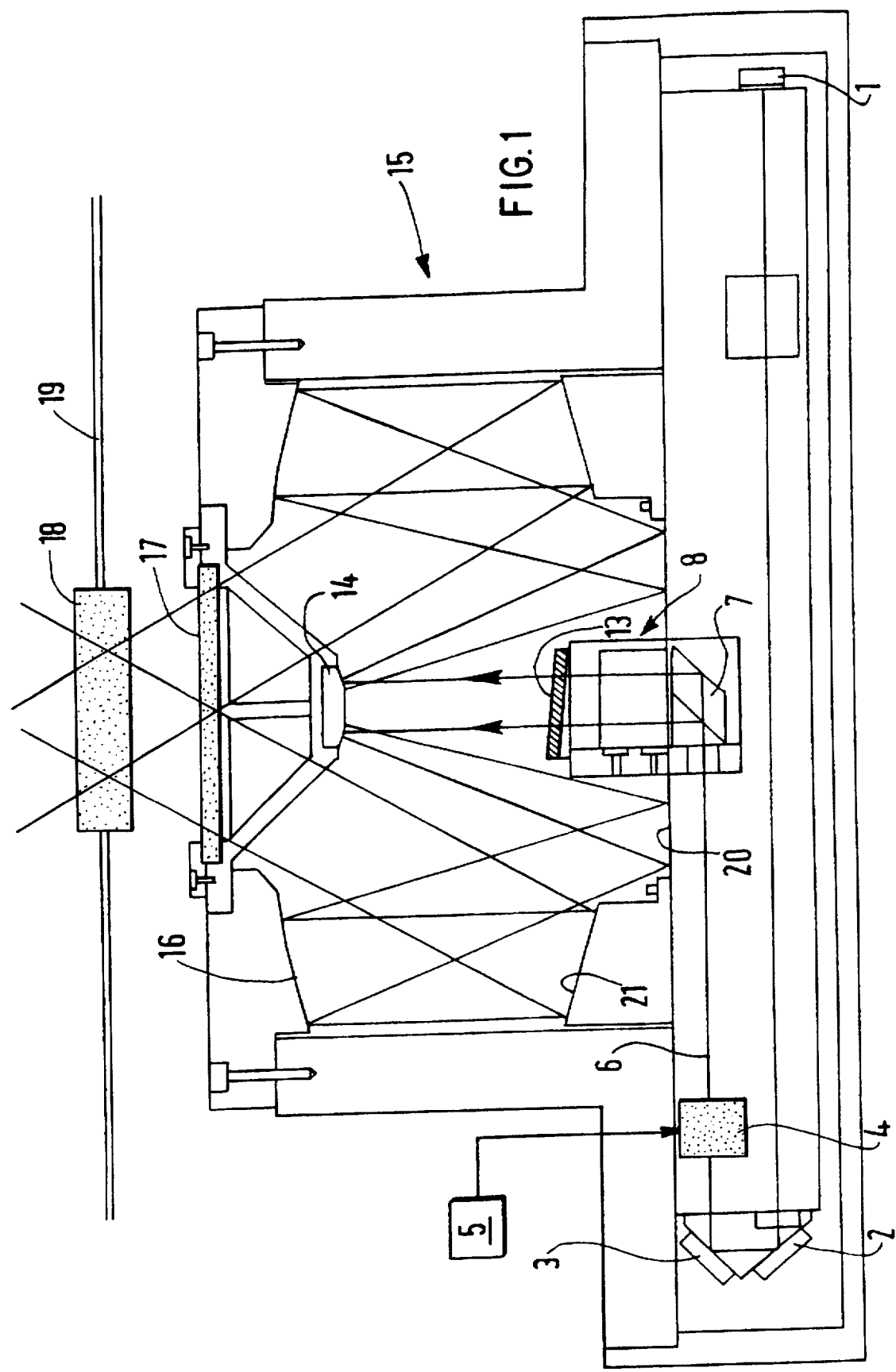
FIG. 1 is a view in section of a transceiver head according to the invention, for a speed indicator with four measuring axes.

The transceiver head that is presented in FIG. 1 comprises a laser 1 whose beam is reflected by mirrors 2 and 3 to polarization switching means 4, for example, liquid-crystal means. Control means 5 switch means 4 in such a way that beam 6 which comes from it alternately exhibits linear polarizations that are shifted by 90°.

Beam 6 is then split into two parallel beams in a prism 7 and, at the output of prism 7, the two beams that are thus produced pass thorough polarization separator 8, which will now be described with reference to FIGS. 2 to 6.

Separator 8 is made of a Glan prism 9 whose active face 10 either is penetrated by two beams (FIGS. 5 and 6) or reflects them toward a mirror 11 (FIGS. 2 and 3), depending on their polarization state. Face 10 of the Glan prism and mirror 11 are parallel, so that the output beams of separator 8, i.e., either two beams 12 that pass through or two twice-reflected beams 12', are parallel.

These beams then penetrate a quarter-wave plate 13 whose output beams therefore have a circular polarization. These latter beams are reflected by small mirror 14 of a telescope 15 toward large mirror 16, which directs them in turn toward the outside in the directions of the four measuring axes, through the output port of device 17 and port 18 that is formed in skin 19 of the aircraft on which the speed indicator mounted.

In fact, large mirror 16 of telescope 15 comprises only four elementary mirrors, one for each beam that comes from polarization separator 8. Furthermore, the light beams are folded inside the telescope by two sets of four planar mirrors 20 and 21; this makes it possible to reduce the length of the device.

It will be noted that there is no beam in normal incidence, which has the effect of eliminating the so-called "Narcissus effect."

The light that is backscattered by the aerosols in the air, and whose circular polarization is therefore inverted, is collected again by telescope 15, whereupon it again penetrates quarter-wave plate 13. Backscattered beams 22 and 22', respectively, which penetrate polarization separator 8, are therefore linearly polarized, but with a shift of 90° relative to the incident beams.

Consequently, beam 22 that comes from beam 12 after penetrating face 10 of the Glan prism is reflected by this same face (FIG. 5). Likewise, beam 22' that comes from beam 12' after being reflected by face 10 penetrates this face (FIG. 2). All the backscattered beams are therefore sent to collimation optics 23, and from there to an analyzer 24, via an optical fiber 25. Optical fiber 25 is preferably a fiber with polarization conservation, to make possible consistent detection (with the aid of a local oscillator) at the level of analyzer 24.

Control means 5 switch polarization switching means 4 alternately from one state to another. Thus, polarization separator 8 alternately allows beams 12 and 12' to pass, which has the effect of allowing analyzer 24 to alternately process two measuring axes, and then the two other axes.

I claim:

1. A transceiver head for a longitudinal laser speed indicator with at least one pair of measuring axes, comprising:

a laser;

a polarization switching means on the path of the laser beam that comes from said polarization switching means, wherein said polarization separating means are arranged such that said beam which comes from said separating means is moved parallel to itself during switching, with output optics being arranged to direct said beam to one of said measuring axes depending upon its movement; and control means for switching said switching means from one state to another to direct said beam alternately to one measuring axis and then to another depending upon its polarization state.

2. A transceiver head according to claim 1, wherein said polarization separation means comprise a Glan prism.

3. A transceiver head according to claim 1, wherein said polarization switching means comprises a electrooptic effect means.

4. A transceiver head according to claim 1, wherein said polarization switching means comprises a elastooptic effect means.

5. A transceiver head according to claim 1, further comprising a telescope that forms output optics.

6. A transceiver head for a longitudinal laser speed indicator with at least one pair of measuring axes, comprising:

a laser;

a polarization switching means on the path of the laser beam that comes from said polarization switching means, control means for switching said switching means from one state to another to direct said beam alternately to one measuring axis and then to another depending upon its polarization state; and a quarterwave plate at the output of said polarization separation means.

7. A transceiver head according to claim 6, wherein said polarization separation means comprise a Glan prism.

8. A transceiver head according to claim 6, wherein said polarization switching means comprises a electrooptic effect means.

9. A transceiver head according to claim 6, wherein said polarization switching means comprises a elastooptic effect means.

10. A transceiver head according to claim 6, further comprising a telescope that forms output optics.

11. A transceiver head according to claim 6, wherein said separating means are arranged such that the beam which comes from them is moved parallel to itself during the switching, with output optics being arranged to direct the beam to one of the measuring axes depending on it movement.

* * * * *